US008186033B1

(12) United States Patent
Glick

(10) Patent No.: US 8,186,033 B1
(45) Date of Patent: May 29, 2012

(54) HAND-HELD TOOL FOR INSERTING FLEXIBLE TAGS INTO A SHELF-MOUNTED PRICE CHANNEL

(76) Inventor: Michelle Glick, Youngsville, LA (US)

( * ) Notice: Subject to any disclaimer, the term of this patent is extended or adjusted under 35 U.S.C. 154(b) by 430 days.

(21) Appl. No.: 12/387,361

(22) Filed: May 4, 2009

(51) Int. Cl.
*B25B 27/00* (2006.01)
*B25B 27/14* (2006.01)
*B23P 19/04* (2006.01)
*G09F 3/18* (2006.01)
*B26B 3/06* (2006.01)
*F41B 13/02* (2006.01)
*F41C 27/18* (2006.01)
*A47B 96/00* (2006.01)
*G09F 27/00* (2006.01)

(52) U.S. Cl. ................ 29/270; 29/269; 29/278; 40/650; 30/162; 248/222.12

(58) Field of Classification Search .................... 29/270, 29/268, 269, 278; 40/650, 657, 661, 638; 30/162, 294, 286, 143; 248/222.12
See application file for complete search history.

(56) References Cited

U.S. PATENT DOCUMENTS 3,074,194 A * 1/1963 Mapson .......................... 40/650
3,708,899 A 1/1973 Berry, Jr.
4,250,608 A * 2/1981 Mulkey ........................... 29/278
4,251,905 A * 2/1981 Romania ......................... 29/268
4,528,795 A * 7/1985 Stemmer et al. ............. 53/284.2
4,531,313 A * 7/1985 Fast ................................ 40/657
4,539,766 A * 9/1985 Fast ................................ 40/638
4,601,102 A * 7/1986 Phillips ........................ 30/123.5
4,718,627 A * 1/1988 Fast et al. ................. 248/222.12
4,911,392 A 3/1990 Fast
5,472,289 A 12/1995 Kringel et al.
5,683,003 A 11/1997 Gebka
6,510,612 B1 * 1/2003 Cybulski ......................... 30/162
6,698,701 B1 * 3/2004 Dalton ..................... 248/222.12
6,857,192 B1 * 2/2005 Summers et al. ............... 30/294
6,983,541 B2 * 1/2006 Kaczorowski .................. 30/286
7,155,853 B2 * 1/2007 Valiulis ........................... 40/661
2009/0235533 A1 * 9/2009 Huang ............................ 30/143

* cited by examiner

*Primary Examiner* — Lee D Wilson
*Assistant Examiner* — Alvin Grant
(74) *Attorney, Agent, or Firm* — Richard L. Mikesell

(57) ABSTRACT

A hand-held tool has a leading edge which is inserted into a price channel and which has a tag exit port defined therein to be located in the price channel when in use and a trailing edge having a tag entrance port defined therein and into which a flexible tag is inserted. A bore connects the entrance port to the exit port and a flexible tag is forced through the entrance port, through the bore and out of the exit port to be positioned in the price channel.

8 Claims, 2 Drawing Sheets

HAND-HELD TOOL FOR INSERTING FLEXIBLE TAGS INTO A SHELF-MOUNTED PRICE CHANNEL

TECHNICAL FIELD OF THE INVENTION

The present invention relates to the general art of display devices, and to the particular field of accessories for display devices.

BACKGROUND OF THE INVENTION

In the merchandising of products on shelves, such as on supermarket or liquor store shelves, it was known to mount price and unit information on the shelf adjacent to the merchandise. Shelves in grocery and other retail stores typically have a channel attached to the distal edge of the shelf. These channels are generally referred to as "price channels." Price channels are typically formed of extruded metal sections, such as an extruded aluminum section. Price channels are adapted to accept cards that display price, weight, or other product information and price channels have also been used to mount advertising and promotional materials on grocery or other retail store shelves.

This information is generally contained on a tag that is inserted into the price channel. The tags are periodically changed as merchandise, pricing or other information changes. Tags also must be changed if they become damaged or defaced due to spillage. The tags must be grasped, pulled out of the channel and new tags inserted into the channel.

Inserting a small and highly flexible tag into a channel is often an time-consuming, tedious and delicate task. This task may be made more difficult if the price channel is clogged due to dirt or dust or spillage. To the inventor's knowledge, this onerous task is presently carried out by hand. The operator's fingers may even be injured by sharp edges and the like. If there is a large merchandise turnover, the task of removing old tags and replacing them with new tags can be extremely time consuming.

Therefore, there is a need for a means to quickly and expeditiously place tags in the channels associated with merchandise shelves.

SUMMARY OF THE INVENTION

The above-discussed disadvantages of the prior art are overcome by a hand-held tool that has a leading edge which is inserted into a price channel and which has a tag exit port defined therein to be located in the price channel when in use and a trailing edge having a tag entrance port defined therein and into which a flexible tag is inserted. A bore connects the entrance port to the exit port and a flexible tag is forced through the entrance port, through the bore and out of the exit port to be positioned in the price channel.

Using the embodying the present invention will permit expeditious and safe positioning of tags in price channels. The operator's fingers will not be subject to paper cuts, or other injury and the tag is not likely to be damaged during insertion into the price channel.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
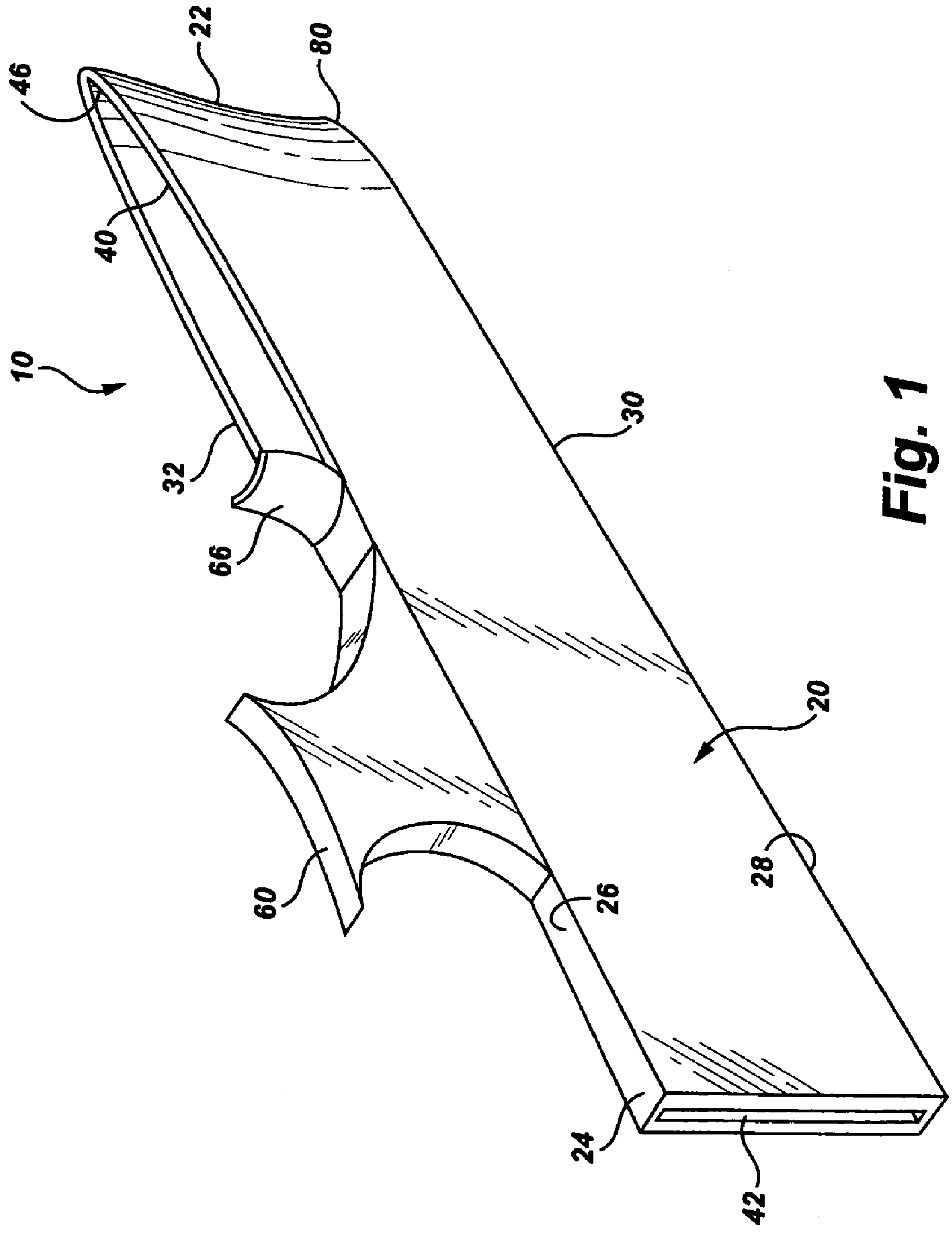
FIG. 1 is a perspective view of a tag inserting tool embodying the principles of the present invention.
Figure 2:
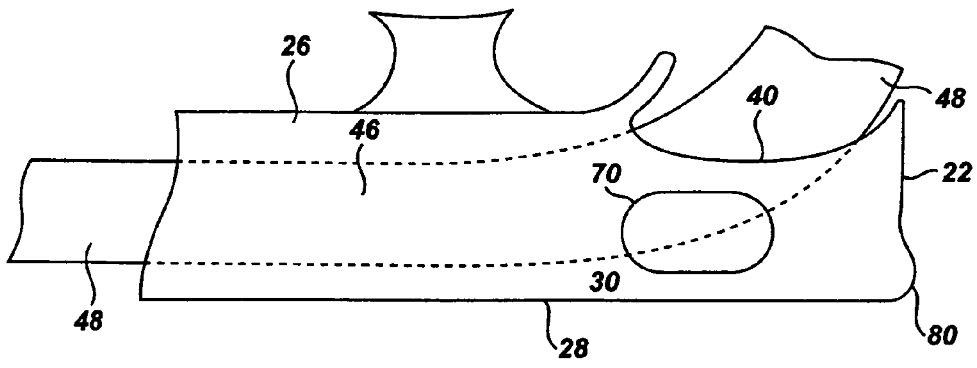
FIG. 2 is a side elevational view of the tool in use.

Referring to the figures, it can be understood that the present invention is embodied in a hand-held and hand-operated tool 10 for use in placing flexible tags 12, such as price and unit information tags commonly associated with items sold in supermarkets, into a price channel 14 located on a front edge 16 of a shelf 18 on which the merchandise is supported for display.

Figure 3:
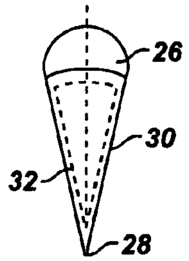
FIG. 3 is an end elevational view of the tool
Figure 4:
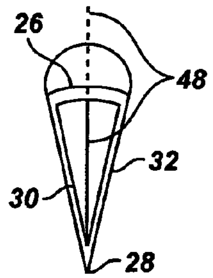
FIG. 4 is an end elevational view of the tool of the end opposite to the end shown in FIG. 3.
Figure 5:
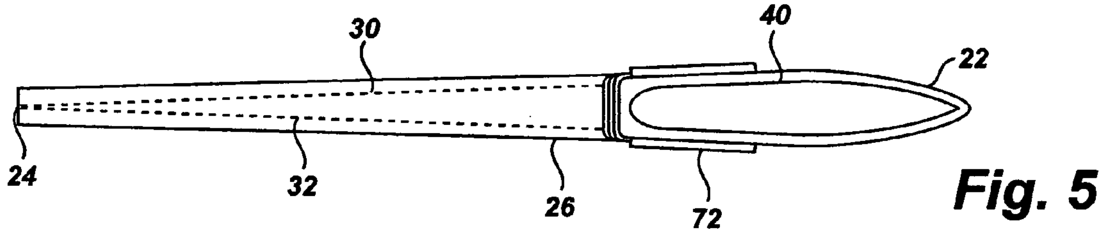
FIG. 5 is a is a top plan view of the tool.
Figure 6:
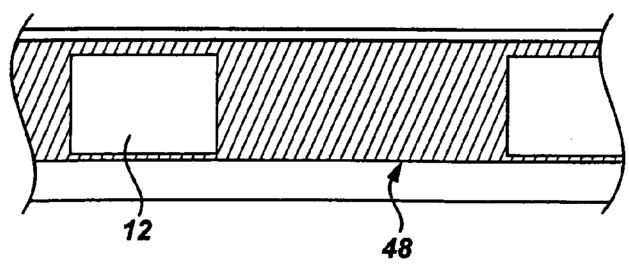
FIG. 6 is a schematic illustrating a price channel having flexible tags positioned therein

Tool 10 includes a rigid body 20 having an edge 22 which is a trailing edge when tool 10 is in use, an edge 24 which is a leading edge when tool 10 is in use, an edge 26 which is a top edge when tool 10 is in use and an edge 28 which is a bottom edge when tool 10 is in use. Body 20 further includes two sides 30 and 32, which are spaced apart from each other to define a thickness dimension for the body. As can be seen in FIGS. 3-5, body 20 tapers from edge 22 to edge 24 so that the thickness of the body adjacent to edge 22 is greater than the thickness of the body and tapers from edge 26 to edge 28 so the thickness of the body is greater adjacent to edge 26 than the thickness of the body adjacent to edge 28. The purpose of the taper will be understood from the teaching of this disclosure.

Body 20 further includes a tag inlet port 40 defined in edge 26 adjacent to edge 22 and a tag outlet port 42 defined in edge 24. An arcuate bore 46 is defined through body 20 to connect inlet port 40 to outlet port 42 whereby a band 48 of flexible tags will flow through bore 46 so the tags can be fed into body 20 via port 40 and will be fed out of the body via port 42. As can be seen in FIG. 4, bore 46 tapers from a first thickness adjacent to top edge 26 to a second thickness adjacent to edge 28 with the first thickness of the bore being greater than the second thickness of the bore. The tapered nature of the bore prevents the band 48 from jamming as it moves through the bore.

A handle 60 is located on top edge 26 adjacent to a cutting element 66 over which band 48 moves so it can be cut where suitable. Two finger grips 70 and 72 are located on sides 30 and 32 respectively to provide a user a secure grip on the tool. A pointed element 80 is located on edge 28 adjacent to edge 22 and is used to open a shelf edge when necessary.

As can be understood from the foregoing, tool 10 is used by inserting leading edge 24 into a price channel with the inlet port 40 located outside the price channel where it is easily accessible to a user, then feeding band 48 into port 40, through bore 46 and out of port 42 which is located in the price bore. Once the flexible band is fed sufficiently far to locate a tag 12 in a selected position in the price channel, the band can be forced over cutting element 66 to separate the band containing the selected tag from the remainder of the band.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A hand-operated tool for use in placing flexible tags into a price channel comprising:

a price channel positioned on a merchandise-supporting shelf when in use;

a flexible tag which is located in the shelf-positioned price channel when in use; and a body having a rigid leading edge that is easily inserted into the shelf-positioned price channel and which has a tag exit port defined therein, a trailing edge having a tag entrance bore defined therein into which the tag is inserted, and a bore defined in the body connecting the entrance and exit ports together so that the tag inserted into the entrance port can be deployed from the body into the price channel via the exit port when the exit port is located in the shelf-positioned price channel.

2. The hand-operated tool defined in claim 1 wherein the body further includes a first edge that is a top edge when the body is in use; a handle on the first edge; the entrance port being defined through the first edge.

3. The hand-operated tool defined in claim 2 further including a cutting element located on the first edge adjacent to the handle.

4. The hand-operated tool defined in claim 3 further including a price channel opener element on the body.

5. The hand-operated tool defined in claim 1 further including finger grips on the body.

6. The hand-operated tool defined in claim 3 wherein the body is tapered from the first edge.

7. The hand-operated tool defined in claim 4 wherein the bore is arcuate.

8. A method of inserting a flexible tag into a shelf-mounted price channel comprising:

mounting a price channel on a merchandise-supporting shelf;

providing a flexible tag which is located in the price channel when in use;

defining a tag exit port in a leading edge of the tool;

inserting the tag exit port in the leading edge of a rigid tool into the price channel;

defining a tag entrance port and a tag exit port on the tool;

positioning the tag entrance port outside the price channel;

defining a bore through the tool to connect the tag entrance port to the tag exit port in the leading edge of the tool; and forcing the flexible tag through the tag entrance port and through the bore and out of the tag exit port into the price channel.

* * * * *